United States Patent [19]

Prell

[11] 4,063,459
[45] Dec. 20, 1977

[54] VARIABLE-SPAN PRESSURE GAUGE

[76] Inventor: George A. Prell, 14202 Galy St., Tustin, Calif. 92680

[21] Appl. No.: 764,441

[22] Filed: Jan. 31, 1977

[51] Int. Cl.² .............................................. G01L 7/08
[52] U.S. Cl. ...................................... 73/397; 73/302; 73/406
[58] Field of Search ............. 73/299, 302, 406, 407 R, 73/397

[56] References Cited

U.S. PATENT DOCUMENTS

| 1,310,648 | 7/1919 | Clift | 73/397 |
| 3,061,823 | 10/1962 | Crossley | 73/407 R |

Primary Examiner—Donald O. Woodiel
Attorney, Agent, or Firm—Francis X. LoJacono

[57] ABSTRACT

A variable-span pressure gauge adapted to be calibrated over a wide pressure range, depending upon particular installation requirements relating to the size of the tank and type of liquid to be stored therein, and wherein the pressure to be measured is introduced through a pressure fitting to a pressure chamber defined by a diaphragm having a force bar mounted thereto, the force bar being arranged to engage a flexible lever so as to be moved with the movement of the diaphragm. A second spring lever is caused to flex with the first lever in an adjusting ratio by means of an adjustable span-slider bar and screw member disposed therebetween, through which the gauge pointer is calibrated. The movement of the second lever causes the rotation of a motion shaft which, in turn, operates a gear train operably inter-disposed between the motion shaft and the pointer, wherein the shaft of the pointer has attached thereto a hairspring to keep the motion amplification loaded against backlash or lost motion, the end result thereof being a pointer rotation which is directly proportional to the applied pressure.

10 Claims, 10 Drawing Figures

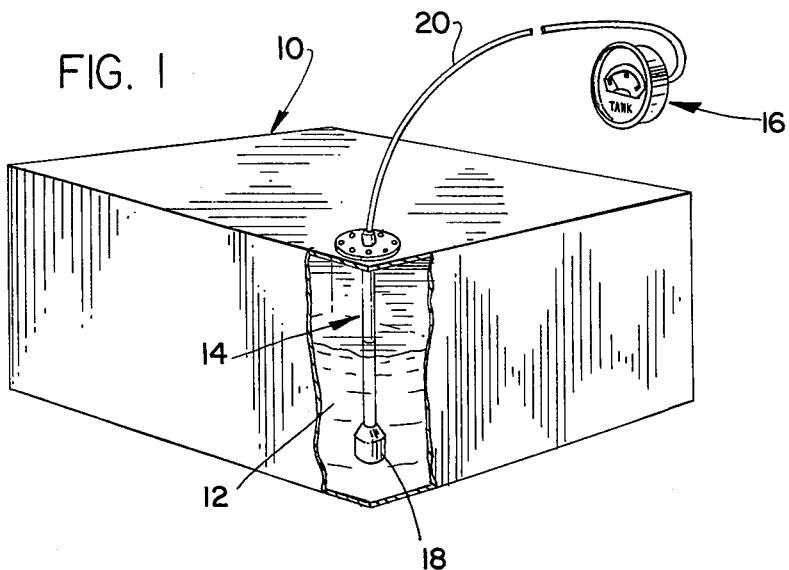
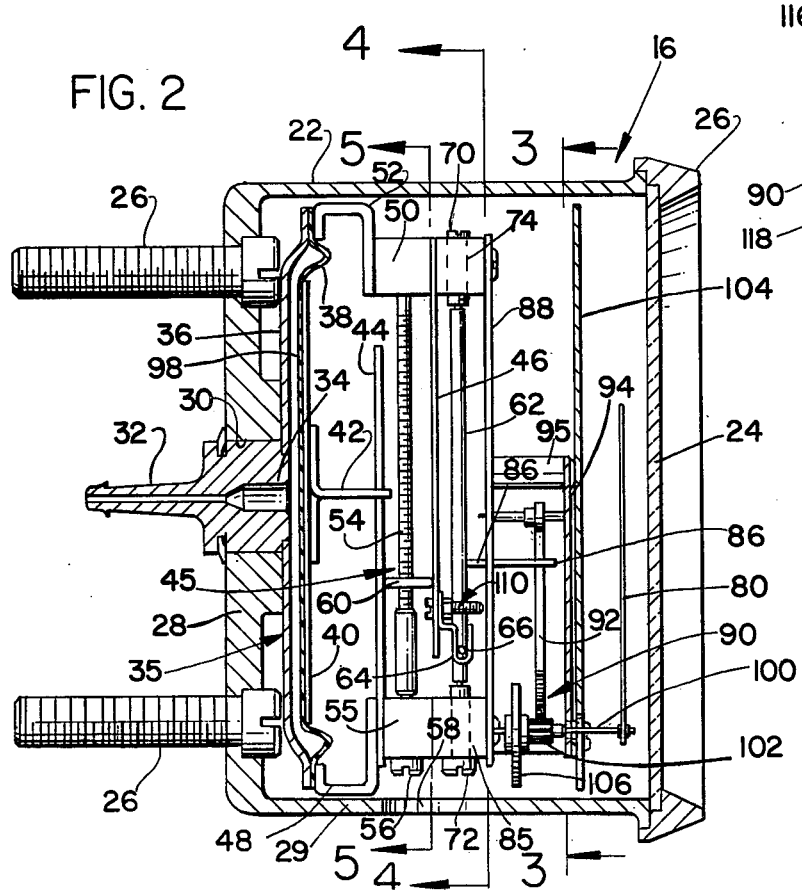

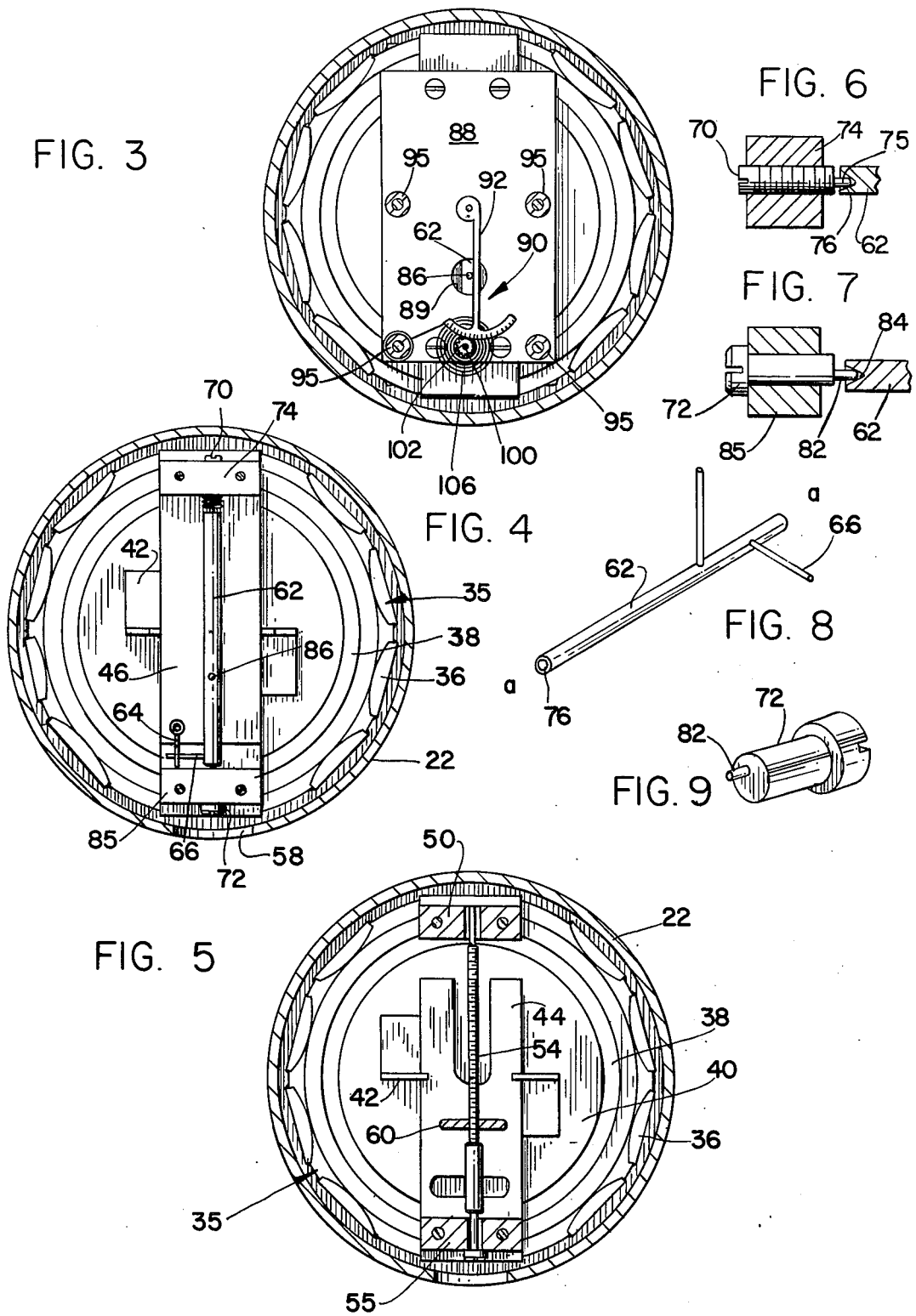

VARIABLE-SPAN PRESSURE GAUGE

BACKGROUND OF THE INVENTION

1. Field of the Invention

This invention relates generally to pressure-sensitive gauges and, more particularly, to a variable-span pressure gauge having means to calibrate the dial pointer over its scale to a wide pressure range, either at the factory or in the field.

2. Description of the Prior Art

As is well known in the art, various problems and difficultes are encountered in providing suitable means for calibrating pressure gauges, particularly gauges that must be adjusted as they are being installed.

There are presently many types of measuring devices to indicate, at any given time, the amount of liquid stored in tanks. However, these units must be provided with an accurate gauge so as to visually indicate the exact amount of liquid stored therein on a constant basis.

Level-indicating devices—particularly those comprising mechanical connections with rods, floats, springs, and other various moving parts—have not been found to be very reliable due to wear, tear and abuse that such mechanical devices must endure.

However, there are some liquid level indicators that do not use mechanical devices, but rely on pressure within their systems. One of the most reliable systems available today is found in U.S. Pat. No. 3,922,915.

This apparatus has been designed to accurately indicate the level of a given liquid in a given size tank or housing. However, it has been found that, because of the various types of liquids and various sizes of the tanks utilized, there has developed a need for an adjustable gauge that can be simply and accurately calibrated to the particular requirements of the liquid and volume of the storage capacity of the tank.

The apparatus as mentioned above, along with the disclosed device hereinafter described, are very readily adapted for use with liquid storage tanks of large vehicles, motor homes, recreational vehicles, boats, etc. As can be understood, these tanks house fuel, water, or other liquids having varying characteristics stored therein; and, thus, the gauges must be capable of being adjustable for individual requirements.

SUMMARY OF THE INVENTION

The present invention, when used in conjunction with a pressure system of varying requirements, can be simply calibrated to accommodate any given condition of tank size and type of liquid stored therein.

Accordingly, the present device comprises a variable-span pressure gauge having a gauge housing wherein there is disposed a pressure fitting that is connected into a system as described in U.S. Pat. No. 3,922,915. That is, a pressure line is connected between the apparatus in the above patent or like device and the pressure fitting, wherein the fitting communicates with a pressure chamber defined by a typical diaphragm having a force bar mounted thereto. The force bar engages a first spring-like lever so as to move the lever as the diaphragm is actuated by pressure received therein from the interconnected tank. A second spring lever is positioned above and parallel to the first lever having an adjustable-span slider bar and screw member interposed therebetween, whereby the movement of each lever can be adjusted linearly. Thus, through the adjustment of the slider bar, the gauge pointer can be calibrated to read a specific amount of liquid in a full tank under any given size of tank and type of liquid therein.

The second lever is operably engaged with a rotational motion shaft which engages and moves a gear train interdisposed between the second lever and the gauge pointer, whereby the shaft of the gauge pointer is provided with a gear of the gear train. Once the pointer is calibrated, any movement of the diaphragm will cause the pointer to react directly proportional to the applied pressure relative to the particular set of conditions.

To prevent backlash or lost motion, the pointer is also arranged to be provided with a hairspring.

OBJECTS AND ADVANTAGES

The present invention has for an important object a provision wherein a pressure gauge includes means for adjusting and calibrating the gauge to suit a particular condition or conditions.

It is another object of the invention to provide a variable-span pressure gauge that is adapted to be associated with pressure-sensitive systems.

It is further another object of the present invention to provide an adjustable pressure gauge for use with a liquid-level-indicating device that operates automatically to pressure response within the pressure system, the pressure response being affected by the level of liquid disposed within the tank.

It is still a further object of the invention to provide an adjustable pressure gauge that is compatible with existing liquid-level-indicator systems such as that taught in U.S. Pat. No. 3,922,915, thus providing a greatly improved and reliable operation.

A still further object of the invention is to provide a gauge of this character that can be adjusted so as to react directly proportional to the applied pressure relative to the particular set of conditions.

Still another object of the present invention is to provide a device of this character that can be adjusted in field operation without special tools.

It is a further object of the invention to provide an adjustable gauge as herein described that is easy to service and maintain, and has a more dependable and durable life generally not obtainable heretofore with other devices of this type.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or modes of operation that are properly within the scope of the appended claims.

DESCRIPTION OF THE DRAWINGS

Referring more particularly to the accompanying drawings, which are for illustrative purposes only:

FIG. 1 is a pictorial view of a liquid storage tank having a level-indicator arranged therein wherein the present variable gauge is attached thereto;

FIG. 2 is an enlarged cross-sectional view taken substantially along line 2—2 of FIG. 1 thereof;

FIG. 3 is a cross-sectional view taken substantially along line 3—3 of FIG. 2, illustrating the arrangement of the gear train;

FIG. 4 is a cross-sectional view taken along line 4—4 of FIG. 2 wherein the motion shaft and its related elements are shown;

FIG. 5 is a cross-sectional view taken along line 5—5 of FIG. 2, showing the arrangement of the span-adjusting screw and slider bar mounted thereon;

FIG. 6 is an enlarged, cross-sectional view of one end of the mounting arrangement of the motion shaft;

FIG. 7 is an enlarged, cross-sectional view of the opposite adjustable end of the motion shaft;

FIG. 8 is a perspective view of the motion shaft; and

FIG. 9 is a perspective view of the motion-shaft-adjusting screw.

DESCRIPTION OF THE PREFERRED EMBODIMENT

Referring more particularly to the drawings and specifically to FIG. 1, there is shown a tank or container, generally indicated at 10, having stored therein a liquid 12 —the liquid being any suitable product such as gasoline, diesel oil, water, etc.—disposed in a tank having any depth.

It should be understood that variables in liquids and sizes of tanks create the common problem with most gauges —that is, with gauges that cannot be adjusted to meet the above variables, particularly at on-sight locations.

Mounted within the tank there is shown an apparatus 14 defined as a liquid-level indicator. As previously mentioned, the most suitable liquid-level indicator is described in detail in U.S. Pat. No. 3,922,915, wherein the present adjustable gauge, generally indicated at 16, is shown attached to the level-sending unit 18 through a flexible relay tube 20.

Accordingly, it is important to note that the level indicator apparatus 14 does not have any moving parts; and the pressure developed within its system is determined by the type of liquid 12 and the size of the tank 10.

Therefore, each individual tank having a particular liquid stored therein will give a different reading when a fixed scale is used.

Hence, the following description of the present invention will enable one to readily understand its novel potential in the art, wherein the present invention comprises a variable-span gauge 16 having housing 22, including a typical glass cover 24 and snap rim 26. Various mounting means can be provided therewith and are herein shown as a pair of bolts 26 mounted through the base wall 28 of housing 22, which is also defined by an annular wall 29.

The base wall 28 is provided with a center bore 30 in which is mounted a pressure fitting 32 to which flexible tube 20 is attached from sending unit 18. Mounted to the inner open end 34 of fitting 32 is a pressure-responsive means to receive the indicated pressure. This means is defined by a diaphragm, indicated generally at 35, having a diaphragm-base plate 36 directly attached to fitting 32 and a flexible diaphragm sheet 38 of suitable material, the sheet being enforced with a stiffener plate 40, as is generally known in the art. Hence, the diaphragm is firmly affixed in housing 22.

A force bar 42 is centrally positoned and secured to said stiffener plate 40 so as to move laterally and outwardly with the movement of the diaphragm sheet 38. The force bar directly engages a first spring-lever bar 44, which is part of the variable adjusting means. Said variable adjusting means also includes a second, main spring-lever bar 46 and means to adjust the related movement between said first and second spring bar members, generally indicated at 45.

The first spring bar member 44 is mounted at one end thereof to mounting bracket 48, said bracket being supported to the diaphragm 35. Spring bar member 44 extends inwardly to a point beyond bar 42 so as to be engaged therewith. Said second spring lever bar 46 is positioned above said first spring 44 in parallel relation thereto, as seen in FIG. 2. Spring-lever bar 46 is mounted at one end to a support block 50 which is mounted to a second support barcket 52, said second support bracket 52 being oppositely arranged to said first support bracket 48, whereby each spring lever 44 and 46 extends inwardly from opposite sides of the unit.

The means for adjusting the proper movement between each spring-lever bar comprises an elongated span-adjustment screw 54 freely mounted at its ends within support block 50 and the oppositely disposed support block 55, the screw having a screw head 56 which is accessible through opening 58 in the annular wall 29 of housing 22.

Accordingly, it can be seen in FIGS. 2 and 5 that span screw 54 is centrally disposed longitudinally between each spring-lever member 44 and 46. Thus, to create the necessary spring leverage between each spring member, there is threadably secured to screw 54 a span-slider-bar member 60 which can be adjusted to any required location between each spring lever by rotating screw 54. Thus, as slider-bar member 60 is moved longitudinally along the axis of screw 54, the ratio of movement between each spring lever 44 and 46 is changed. It should be noted that the stiffness of spring lever 44 is approximately ten percent or less than that of spring lever 46, spring 46 being the main lever of the two.

The flexing movement of spring lever 46 is transferred to a motion shaft 62 by means of a coupling member 64 that is secured to the free end of the main spring lever 46, as seen in FIGS. 2 and 4, wherein said motion shaft includes a laterally extending arm 66 positioned normal to axis a—a of said motion shaft 62, as seen in FIGS. 4 and 8. Thus, any lateral movement of lever 46 is transferred to shaft 62, causing shaft 62 to rotate about its axis a—a.

Motion shaft 62 is supported at its opposite ends by a pair of pivot screws 70 and 72, respectively. Pivot screw 70, as detailed in FIG. 6 as a screw threadably mounted into an upper support block 74, wherein a support pin 75 integrally formed in screw 70 is freely received in recess 76 disposed in one end of said shaft 62. The second pivot screw 72 forms an eccentric lug which defines a means to adjust the gauge pointer 80 to zero; so as to provide a very fine adjustment. Pivot screw 72 includes a pivot pin 82 which is eccentrically arranged thereon and is adapted to be received in recess 84 of the opposite end of shaft 62, said pivot screw 72 being mounted in a support block 85 which is mounted to lower block 55.

A second arm 86, referred to as a drive arm, is also secured to motion shaft 62 and extends outwardly therefrom through the lower gear-train-support plate 88 having an aperture 89 formed therein. The gear train, generally indicated at 90, comprises a gear-tooth sector 92 pivotally mounted between the lower support plate 88 and the upper gear-train-support plate 94, said plates being held in spaced relationship to each other by a plurality of studs 95. Thus, gear sector 92 is mounted to a pivot pin 96 which is centrally positioned within the housing 22.

As force is applied to sector gear 92 by drive arm 86, said sector gear will reciprocate, depending upon the pressure received in the diaphragm chamber 98.

To provide arcuate motion to pointer 80, the shaft 100 of said pointer 80 has affixed thereto a spur gear 102 for operating engagement with sector gear 92. (This can be seen in FIGS. 2 and 3.) Thus, an arcuate motion is imparted to said gauge pointer, whereby an accurate reading of the dial-indicator plate 104 can be visually made through glass cover 24.

A hairspring 106 of any suitable type is attached to pointer shaft 100; this will, in turn, keep the motion-amplification system loaded against backlash or lost motion, wherein the end result is that the pointer rotation will be directly proportional to the applied pressure from the tank.

Thus, in summary, pressure is received directly from a tank of liquid through line 20 into chamber 98 of diaphragm 35, causing lateral movement of force bar 42 which will flex spring-bar member 44. Spring member 44 will, in turn, flex the main spring-bar member 46 through span-bar member 60, said span bar being adjustable along the longitudinal length of said spring members 44 and 46, to adjust and calibrate the pointer to compensate for the particular size of the tank and type of liquid stored therein. The coupling means between the main spring member 46 and the motion shaft 62 causes shaft 62 to rotate about its axis, wherein the ends of said shaft are freely journaled to the pivot means, one of said pivots providing a means to accurately adjust the pointer to zero. That is, the movement of the eccentric pin 82 of pivot screw 72 causes a very slight movement in drive arm 86, allowing gear sector 92 to be adjusted about its pivot point.

Accordingly, as motion shaft 62 is rotated, drive arm 86 engages sector gear 92, causing pointer shaft to rotate through engaging gear 102.

In addition, there is also provided a stop means which is shown as an adjusting nut and bolt 110. This means prevents any overloading pressures to move the related elements to a breaking point. If an overload of pressure is received, the bolt will abut against support plate 88, thus preventing over-travel of shaft 62 and drive arm 66. This device is very sensitive to pressure, and only slight movements are necessary to operate the pointer 80.

Referring to FIG. 10, there is shown an alternative arrangement of the gear train 90 wherein pointer 90 is pivoted from the approximate center of the dial plate 104. It is to be noted that pointer shaft 112 still includes a pinon gear 114 and hairspring 116, gear 114 being driven by sector gear 118 which in this embodiment is pivotally arranged in an opposite manner to that of the first disclosed location. This then will allow for a greater arcuate movement of pointer 80.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and I do not wish to be restricted to the specific form shown or uses mentioned, except as defined in the accompanying claims.

I claim:

1. A variable-span pressure gauge adapted to be employed in conjunction with non-mechanical, liquid-level indicators having a pressure-responsive system, wherein said gauge comprises:

a housing having a dial-indicator plate removably mounted therein;

means for attaching said pressure-responsive system to said gauge;

means forming a pressure-responsive chamber to receiver pressure from said pressure-response system;

a first, flexible, spring-lever member arranged to be actuated by said pressure-responsive chamber;

a second, flexible, spring-lever member spaced apart and positioned above said first, flexible, spring-lever member in a substantially parallel relationship to one another;

variable adjusting means interposed between said spaced-apart, flexible, spring-lever member to control the movement ratio therebetween;

a motion shaft rotationally supported in said housing;

coupling means mounted between said second spring-lever member and said motion shaft to transfer linear motion of said second spring lever into rotational motion of said motion shaft;

a gear train operably arranged to be driven by the movement of said motion shaft;

drive means mounted to said motion shaft and operably engaging said gear train;

a pointer having a pointer shaft connected to said gear train to actuate said pointer in an arcuate movement; and biasing means arranged with said gear train and said pointer to control movement of said pointer.

2. A variable-span pressure gauge as recited in claim 1, wherein said means for forming a pressure-responsive chamber comprises:

a diaphragm-base plate secured to said attaching means;

a flexible diaphragm operably sealed to said base plate defining said pressure chamber therebetween;

a stiffener plate mounted to said flexible diaphragm, and wherein said stiffener includes;

a force bar attached to said stiffener plate and arranged to forceably engage said first flexible spring lever.

3. A variable-span pressure gauge as rectied in claim 2, wherein said first and second flexible spring-lever members are fixedly secured at oppositely arranged ends, and having free ends thereof extending inwardly from said fixed ends and overlapping each other.

4. a variable-span pressure gauge as recited in claim 3, wherein said variable adjusting means comprises:

a pair of oppositely-disposed, lower-support blocks;

an elongated span-adjustment screw freely supported at each end thereof in said support blocks positioned longitudinally between said first and second spring-lever members; and a span-slider bar threadably mounted to said span-adjustment screw and arranged to engage adjacent surfaces of said first and second spring-lever members, whereby the adjusted position of said slider bar controls the flexible span between said spring-lever members, wherein the ratio of movement between each spring-lever member allows the movement of said motion shaft to be calibrated to individual requirements of said gauge.

5. A variable-span pressure gauge as recited in claim 4, wherein said coupling means comprises:

a coupling member attached to the free end of said second spring-lever member; and a coupling arm mounted to said motion shaft extending laterally and outwardly therefrom normal to the axis of said motion shaft, and arranged to engage said coupling member to transfer linear motion of said second spring lever to rotational motion of said motion shaft.

6. A variable-span pressure gauge as recited in claim 5, wherein said motion shaft includes zero calibrating means of said pointer.

7. A variable-span pressure gauge as recited in claim 6, wherein said zero calibrating means comprises:

a pair of upper support blocks mounted to said lower support blocks;

a pivot screw mounted in one of said upper support blocks, and being threadably adjustable therein, and an eccentric pivot lug having a pivot pin eccentrically arranged to engage one end of said motion shaft; and wherein each end of said motion shaft includes recesses to receive said pivot screw and said eccentric pivot lug, said eccentric pivot lug being supported in one of said upper support blocks.

8. A variable-span pressure gauge as recited in claim 6, wherein said gear train comprises:

a sector gear arranged to be engaged with said drive means mounted to said motion shaft to cause arcuate movement to said sector gear; and a spur gear mounted to said pointer shaft and driven by said sector gear.

9. A variable-span pressure gauge as recited in claim 6, wherein said biasing means comprises a hairspring supported on said pointer shaft.

10. A variable-span pressure gauge as recited in claim 8, wherein said means for attaching said pressure-responsive system to said gauge comprises a pressure fitting having a central bore therein to provide pressure flow into said chamber.

* * * * *